US012658488B2

(12) United States Patent
Ahn et al.

(10) Patent No.: US 12,658,488 B2
(45) Date of Patent: Jun. 16, 2026

(54) SECONDARY BATTERY WITH SWELLING SENSOR

(71) Applicant: SAMSUNG SDI CO., LTD., Yongin-si (KR)

(72) Inventors: Moonsan Ahn, Yongin-si (KR); Youngho Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 552 days.

(21) Appl. No.: 18/135,435

(22) Filed: Apr. 17, 2023

(65) Prior Publication Data

US 2024/0186600 A1      Jun. 6, 2024

(30) Foreign Application Priority Data

Dec. 5, 2022    (KR) ........................ 10-2022-0167898

(51) Int. Cl.
| *H01M 10/48* | (2006.01) |
| *H01M 10/42* | (2006.01) |
| *H01M 10/46* | (2006.01) |
| *H01M 50/417* | (2021.01) |

(52) U.S. Cl.
CPC ......... *H01M 10/48* (2013.01); *H01M 10/425* (2013.01); *H01M 10/46* (2013.01); *H01M 50/417* (2021.01); *H01M 2010/4271* (2013.01)

(58) Field of Classification Search
None
See application file for complete search history.

(56) References Cited

U.S. PATENT DOCUMENTS

| 2006/0093896 | A1 | 5/2006 | Hong et al. |
| 2017/0077561 | A1 | 3/2017 | Fukuda et al. |
| 2019/0097278 | A1 | 3/2019 | Park et al. |
| 2020/0212417 | A1* | 7/2020 | Hu ...................... H01M 10/425 |
| 2021/0328278 | A1 | 10/2021 | Asakawa et al. |

FOREIGN PATENT DOCUMENTS

| CN | 112913068 | A | 6/2021 |
| EP | 4068462 | A1 | 10/2022 |
| JP | 6176632 | B2 | 8/2017 |
| KR | 10-0579377 | B1 | 5/2006 |
| KR | 10-2009-0120268 | A | 11/2009 |
| KR | 10-2011-0037378 | A | 4/2011 |
| KR | 10-2022-0015551 | A | 2/2022 |
| KR | 10-2022-0049141 | A | 4/2022 |
| WO | WO 2019/059571 | A1 | 3/2019 |

OTHER PUBLICATIONS

European Search Report dated Oct. 31, 2023, of the corresponding European Patent Application No. 23172945.0.
Korean Notice of Allowance dated Nov. 12, 2025, for corresponding Korean Patent Application No. 10-2022-0167898.

* cited by examiner

*Primary Examiner* — Wyatt P Mcconnell
(74) *Attorney, Agent, or Firm* — Lee IP Law, P.C.

(57) ABSTRACT

A secondary battery comprising an electrode assembly including a positive electrode, a negative electrode, and a separator, a case accommodating and sealing the electrode assembly, and a swelling sensor on an outer side of the case, wherein the swelling sensor includes a base film on which a plurality of incised portions are disposed, and a conductive line on the base film passing among the plurality of incised portions.

20 Claims, 11 Drawing Sheets

SECONDARY BATTERY WITH SWELLING SENSOR

CROSS-REFERENCE TO RELATED APPLICATION

Korean Patent Application No. 10-2022-0167898, filed on Dec. 5, 2022, in the Korean Intellectual Property Office, is incorporated herein by reference in its entirety.

BACKGROUND

1. Field

The present disclosure relates to a secondary battery.

2. Description of the Related Art

An internal temperature of a secondary battery may increase when it is overcharged, and an electrolyte solution may decompose, generate gas, and increase an internal pressure when its internal temperature rises. In this case, a case of the secondary battery may stretch outward to generate a swelling phenomenon. The swelling phenomenon may also be generated by over-discharging, an internal short-circuit, an external short-circuit, and external heat in addition to overcharging.

SUMMARY

Embodiments are directed to a secondary battery. The secondary battery may include an electrode assembly having a positive electrode, a negative electrode, and a separator. The electrode assembly may also have a case accommodating and sealing the electrode assembly, and a swelling sensor on an outer side of the case. The swelling sensor may include a base film on which a plurality of incised portions are disposed, and a conductive line on the base film passing among the incised portions.

Embodiments are also directed to a secondary battery. The secondary battery may include an electrode assembly having a positive electrode, a negative electrode, and a separator. The electrode assembly may also have a case accommodating and sealing the electrode assembly, and a swelling sensor attached to an outer side of the case. The swelling sensor may include a base film for providing a plurality of incised portions and including a plurality of bridges among the incised portions, and a conductive line on the bridges. When the case swells, the base film is transformed, at least one of the bridges may be damaged, and the conductive line may be incised.

BRIEF DESCRIPTION OF THE DRAWINGS

Features will become apparent to those of skill in the art by describing in detail exemplary embodiments with reference to the attached drawings in which.

DETAILED DESCRIPTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
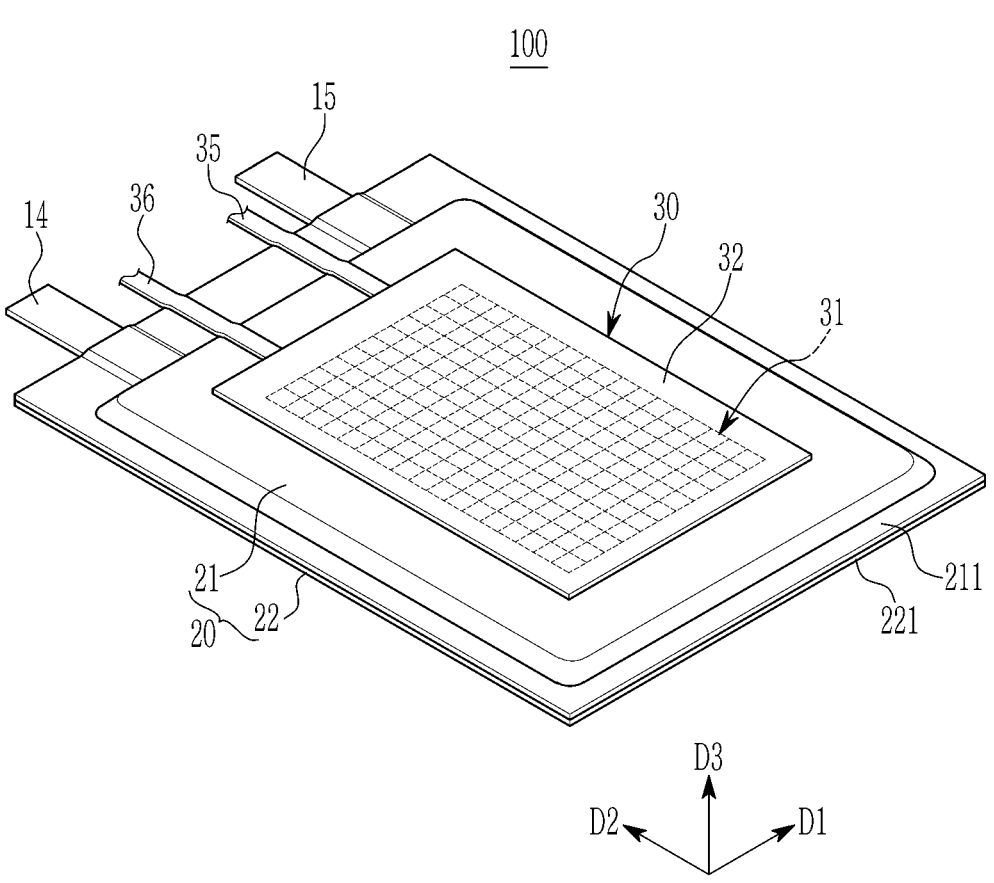
FIG. 1 shows a perspective view of a secondary battery according to an example embodiment.
Figure 2:
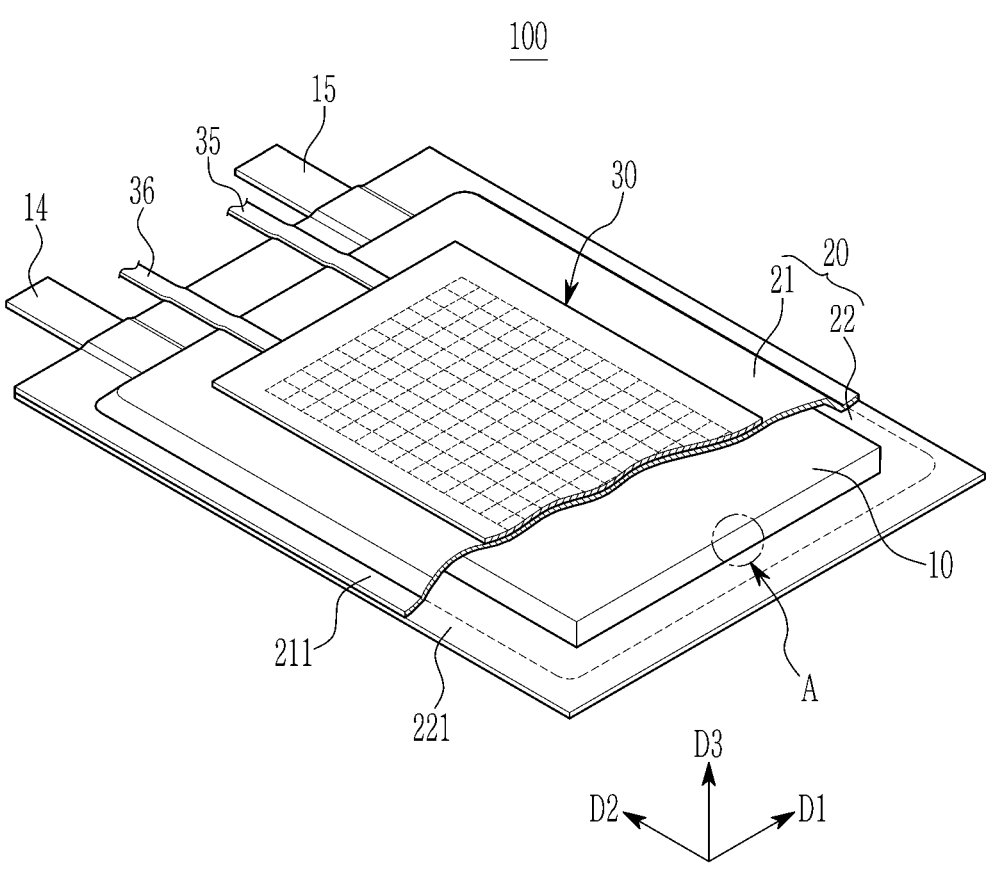
FIG. 2 and FIG. 3 show partially cut-away views of an example embodiment of a secondary battery shown in FIG. 1.
Figure 3:
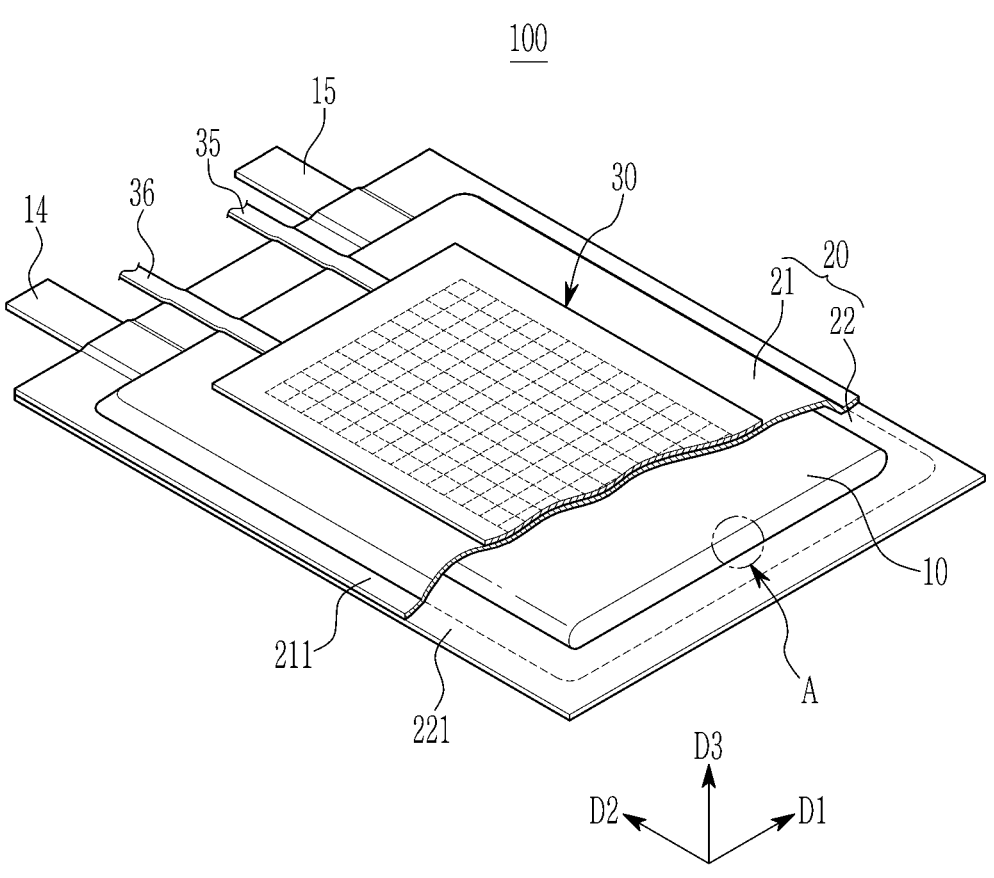
Figure 4:
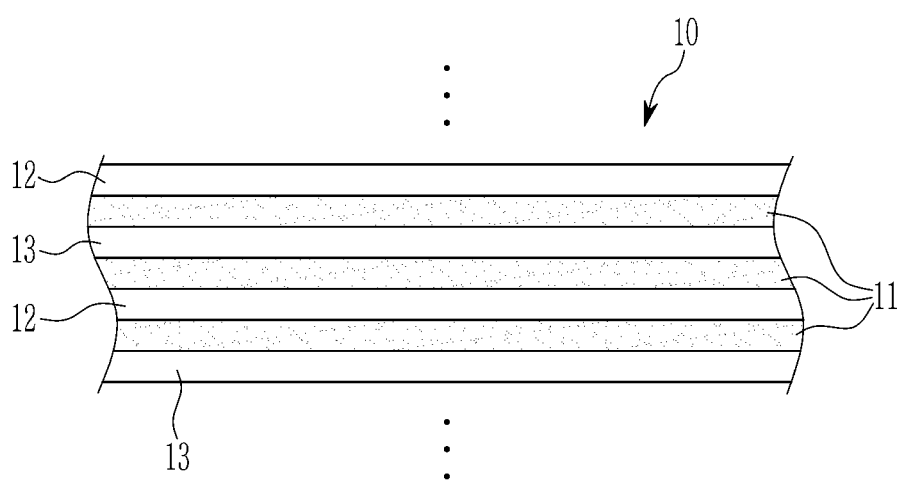
FIG. 4 shows an enlarged view of an area A marked in FIG. 2 and FIG. 3.

FIG. 1 shows a perspective view of a secondary battery according to an example embodiment, FIG. 2 and FIG. 3 show partially cut-away views of a secondary battery shown in FIG. 1, and FIG. 4 shows an enlarged view of an area A marked in FIG. 2 and FIG. 3.

Referring to FIG. 1 to FIG. 4, the secondary battery 100 may include a electrode assembly 10, a case 20 for receiving the electrode assembly 10 and an electrolyte solution, and a swelling sensor 30 positioned on an outer side of the case 20.

The electrode assembly 10 may include a positive electrode 12 and a negative electrode 13 with a separator 11 positioned therebetween. The positive electrode 12 may include a positive electrode current collector, and a positive electrode active material layer positioned on the positive electrode current collector. The negative electrode 13 may include a negative electrode current collector, and a negative active material layer positioned on the negative electrode current collector.

The positive electrode current collector may include a metal foil such as aluminum, and the positive electrode active material layer may include an active material such as a transition metal oxide. The negative electrode current collector may include a metal foil such as copper or nickel, and the negative active material layer may include an active material such as graphite or carbon. The separator 11 may, e.g., include a complex film of a polyethylene and a polypropylene.

The positive electrode 12, the negative electrode 13, and the separator 11 may respectively have a square sheet shape, and the positive electrode 12 and the negative electrode 13 may be alternately stacked with the separator 11 therebetween to thus configure the electrode assembly 10. FIG. 2 shows a stack-type electrode assembly.

Meanwhile, the positive electrode 12, the negative electrode 13, and the separator 11 may respectively have a band shape, and a stack of the positive electrode 12, the separator 11, the negative electrode 13, and the separator 11 may be wound and pressed to be flat, and may resultantly configure an electrode assembly in a jelly roll shape. FIG. 3 shows an electrode assembly 10 in a jelly roll shape.

A positive uncoated region in which no positive electrode active material layer is positioned may be on the positive electrode current collector on a first end portion of the electrode assembly 10, and a negative uncoated region in which no negative active material layer is positioned may be on the negative electrode current collector. The secondary battery 100 may include a positive electrode terminal 14 attached to the positive uncoated region, and a negative terminal 15 attached to the negative uncoated region. The positive electrode terminal 14 may be spaced from the negative terminal 15 with a gap therebetween.

The electrode assembly 10 may be received in the case 20 with the electrolyte solution. The electrolyte solution may, i.e., include a lithium salt such as $LiPF_6$ or $LiBF_4$ dissolved in an organic solvent. The case 20, which may be made of an exterior material, may receive the electrode assembly 10 and the electrolyte solution, and may close and seals them, and i.e., may be configured into a pouch-type case.

The case 20 may include a first case 21 positioned on a first side (e.g., an upper side) of the electrode assembly 10, and a second case 22 positioned on an opposite side (e.g., a lower side) of the electrode assembly 10. The first case 21 and the second case 22 may commonly include bonding portions 211 and 221 combined along an edge by thermal fusion.

Part of the positive electrode terminal 14 may be positioned inside the case 20, another part thereof may overlap the bonding portions 211 and 221, and the other part may be positioned outside the case 20. Like the positive electrode terminal 14, part of the negative terminal 15 may be positioned inside the case 20, another part may overlap the bonding portions 211 and 221, and the other part may be positioned outside the case 20. The positive electrode terminal 14 and the negative terminal 15 may be electrically connected to an external device. The term "overlap" or "overlapping" may indicate that a layer is either above or below another layer while being located at least partially in the same area with respect to a reference direction, e.g., a vertical direction. It will be understood that when a layer is referred to as "overlapping" another layer, it can be directly over or under that layer or one or more intervening layers may be present.

The swelling sensor 30 may be attached to an outer side of the case 20 and may sense a swelling of the case 20. The swelling sensor 30 may be attached to an outer side of one of the first case 21 and the second case 22, or may be attached to the outer side of the first case 21 and the outer side of the second case 22. FIG. 1 to FIG. 3 show an example in which the swelling sensor 30 may be attached to the outer side of the first case 21.

Figure 5:
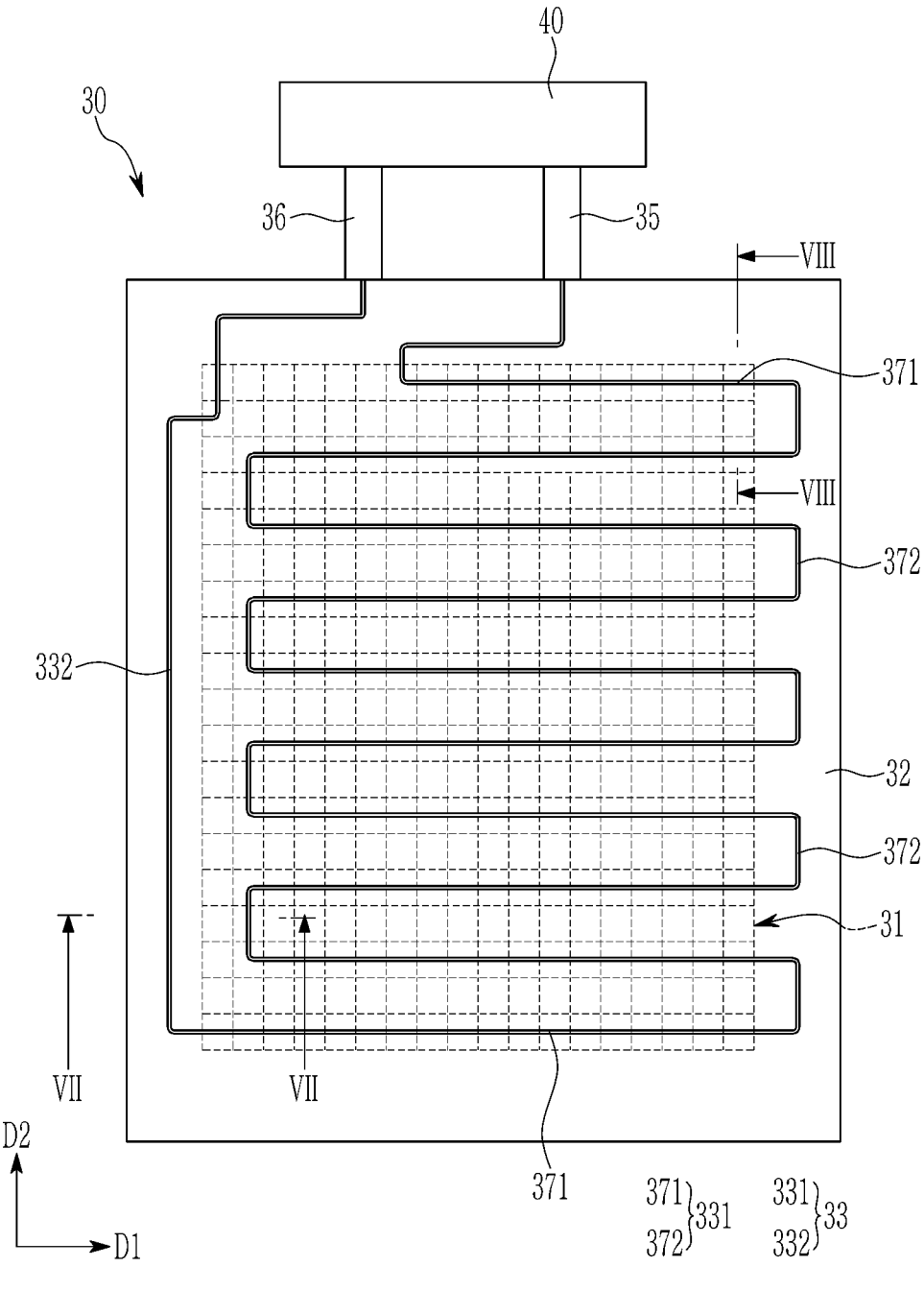
FIG. 5 shows a top plan view of a swelling sensor in an example embodiment of a secondary battery shown in FIG. 1.
Figure 6:
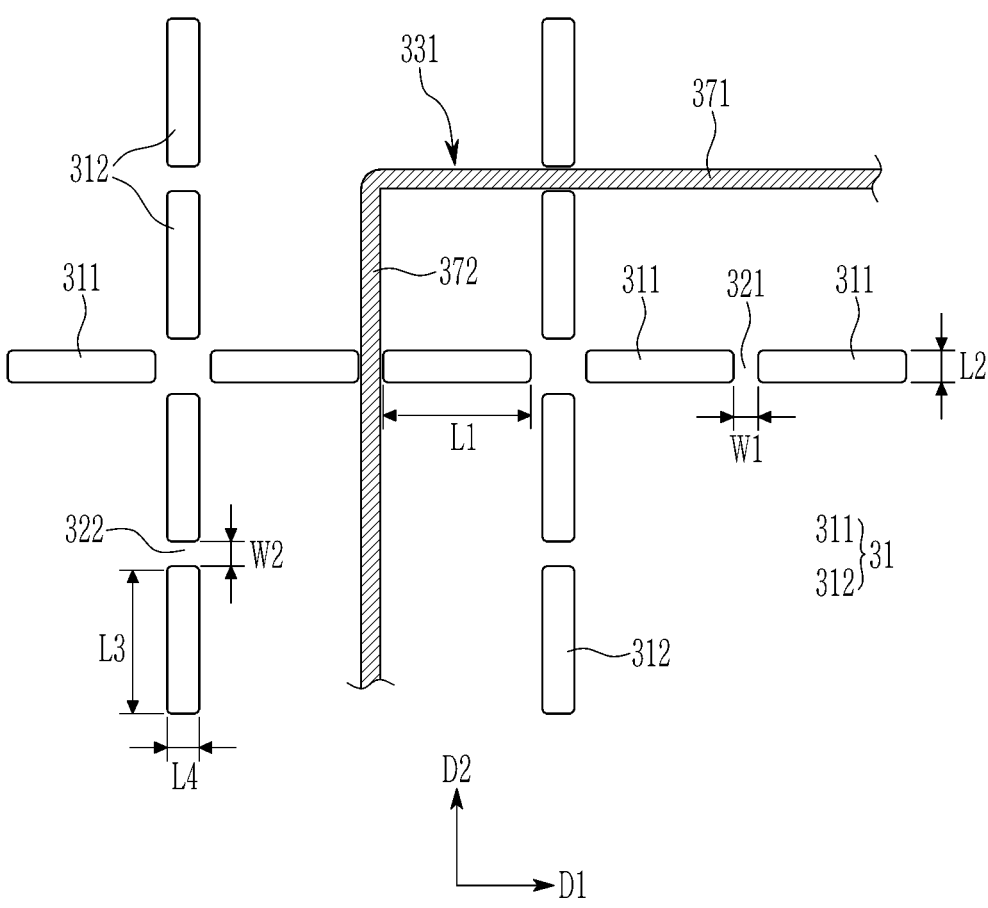
FIG. 6 shows a partially enlarged view of FIG. 5.
Figure 7:
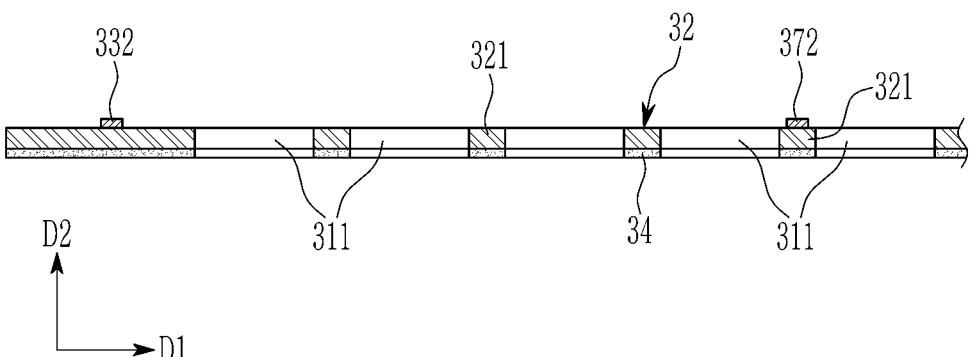
FIG. 7 shows a cross-sectional view of an example embodiment of a swelling sensor incised with respect to a line VII-VII of FIG. 5.
Figure 8:
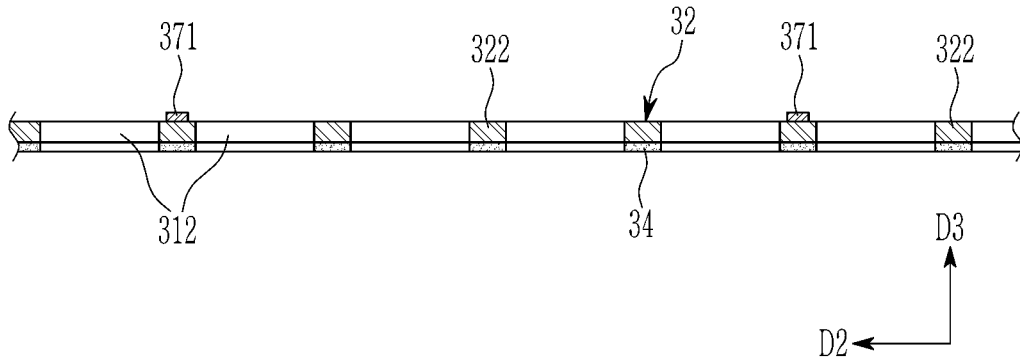
FIG. 8 shows a cross-sectional view of an example embodiment of a swelling sensor incised with respect to a line VIII-VIII of FIG. 5.

FIG. 5 shows a top plan view of an example embodiment of a swelling sensor in a secondary battery shown in FIG. 1, and FIG. 6 shows a partially enlarged view of FIG. 5. FIG. 7 shows a cross-sectional view of a swelling sensor incised with respect to a line VII-VII of FIG. 5, and FIG. 8 shows a cross-sectional view of a swelling sensor incised with respect to a line VIII-VIII of FIG. 5.

Referring to FIG. 5 to FIG. 8, the swelling sensor 30 may include a base film 32 providing a plurality of incised portions 31, a conductive line 33 on the base film 32 passing among the incised portions 31, and an adhesive layer 34 on a first side of the base film 32 facing toward the case 20.

The base film 32 may be a flexible film made of a polymer material, and may be easily bent by an external force. A thickness of the base film 32 may be equal to or less than a thickness of the first case 21. The base film 32 may be attached to the outer side of the first case 21 by the adhesive layer 34, and may be transformed together with the first case 21 when the first case 21 swells.

The incised portions 31 may represent a hole penetrating the base film 32, and may include a plurality of first incised portions 311 positioned in a first direction D1 of the base film 32, and a plurality of second incised portions 312 positioned in a second direction D2 traversing the first direction D1. The first direction D1 may be parallel to a width direction of the secondary battery 100, and the second direction D2 may be parallel to a length direction of the secondary battery 100.

The respective first incised portions 311 may have a polygonal shape with more sides than a triangle, a circular shape, an oval shape, or may have a shape that is parallel to the first direction D1. The shape that is parallel to the first direction D1 may have forms such as a rectangular shape with a long side in parallel to the first direction D1, a rectangular shape with round corners, or a wavy shape with at least one curve.

The respective second incised portions 312 may have a polygonal shape with more sides than a triangle, a circular shape, an oval shape, or may have a shape that is parallel to the second direction D2. The shape that is parallel to the second direction D2 may have forms such as a rectangular shape with a long side in parallel to the second direction D2, a rectangular shape with round corners, or a wavy shape with at least one curve.

The first incised portions 311 may be positioned in a line at intervals in the first direction D1, and the second incised portions 312 may be positioned in a line at intervals in the second direction D2. FIG. 6 shows the rectangular first incised portion 311 and the rectangular second incised portion 312.

On the base film 32, the first incised portions 311 in parallel to the first direction D1 may be positioned to configure a plurality of rows (or horizontal lines) at intervals in the second direction D2, and the second incised portions 312 in parallel to the second direction D2 may be positioned to configure a plurality of columns (or perpendicular lines) at intervals in the first direction D1. The first incised portions 311 and the second incised portions 312 may substantially configure a lattice.

The base film 32 may include a first bridge 321 positioned between two first incised portions 311 neighboring in the first direction D1. A width W1 of the first bridge 321 in the first direction D1 may be less than a length L1 of the long side of the first incised portion 311 in the first direction D1, and may be less than a length L2 of the short side of the first incised portion 311 in the second direction D2. The base film 32 may include a plurality of first bridges 321, and each one of the first incised portions 311 and the first bridges 321 may be alternately positioned in the first direction D1.

The base film 32 may include a second bridge 322 positioned between the two second incised portion 312 neighboring in the second direction D2. A width W2 of the second bridge 322 in the second direction D2 may be less than a length L3 of the long side of the second incised portion 312 in the second direction D2, and may be less than a length L4 of the short side of the second incised portion 312 in the first direction D1. The base film 32 may include a plurality of second bridges 322, and each one of the second incised portions 312 and the second bridges 322 may be alternately positioned in the second direction D2.

The conductive line 33 may pass among a plurality of incised portions 31 and may have a zigzag pattern on the base film 32. The swelling sensor 30 may further include a first terminal 35 and a second terminal 36 connected to the conductive line 33. The first terminal 35 and the second terminal 36 may be spaced from each other at the first edge of the base film 32, and may extend to the outside of the base film 32. The first terminal 35 and the second terminal 36 may be electrically connected to the external circuit 40.

The conductive line 33 may be a metal film with a predetermined thickness and a predetermined width, and may be on a first side (an upper side in the drawing) of the base film 32 that is opposite the adhesive layer 34 according to a method such as a screen printing. A width W3 of the conductive line 33 may be less than the width W1 of the first bridge 321 in the first direction D1, and may be less than the width W2 of the second bridge 322 in the second direction D2. The conductive line 33 may have a zigzag pattern on the first bridge 321 and the second bridge 322.

In an implementation, the conductive line 33 may include a pattern portion 331 passing over the first bridge 321 and the second bridge 322 and have a zigzag pattern, and a return portion 332 connected to the pattern portion 331 and along the first edge of the base film 32. The pattern portion 331 may be connected to the first terminal 35, and the return portion 332 may be connected to the second terminal 36. A conductive path connecting the first terminal 35, the pattern portion 331, the return portion 332, and the second terminal 36 may be provided.

The pattern portion 331 may include a plurality of first straight line portions 371 in parallel to the first direction D1, and a plurality of second straight line portions 372 in parallel to the second direction D2. Each one of the second straight line portions 372 may be alternately connected to the first end portions (a left end portion in FIG. 5) of the first straight line portions 371 and the second end portions (a right end portion in FIG. 5) of the first straight line portions 371 and may configure a zigzag pattern together with the first straight line portions 371.

The return portion 332 may be connected to an end portion of the pattern portion 331, and may be inside the first edge of the base film 32. In an implementation, the return portion 332 may be positioned nearer to the first edge of the base film 32 than the incised portion 31 and the pattern portion 331. The return portion 332 may include at least one straight line portion, and a portion of the return portion 332 near the second terminal 36 may pass above the first bridge 321 and the second bridge 322.

Figure 9:
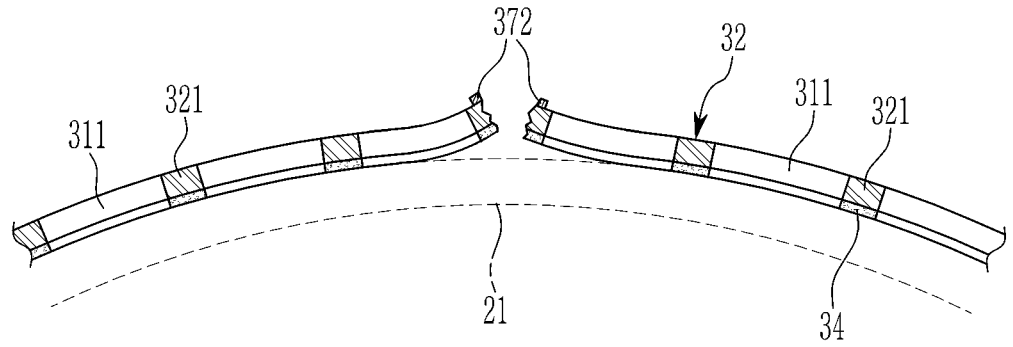
FIG. 9 shows a cross-sectional view of a state of an example embodiment of a swelling sensor when a secondary battery swells.
Figure 10:
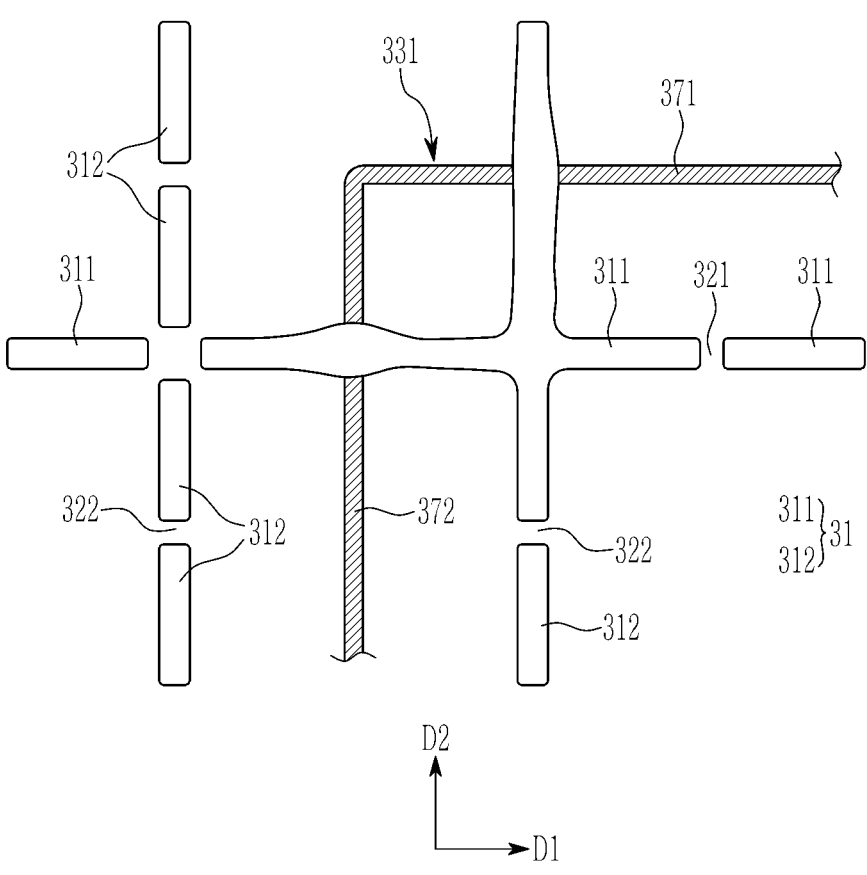
FIG. 10 shows a top plan view of an example embodiment of a swelling sensor shown in FIG. 9.

FIG. 9 shows a cross-sectional view of a state of a swelling sensor when a secondary battery swells, and FIG. 10 shows a top plan view of a swelling sensor shown in FIG. 9. Referring to FIG. 1, FIG. 9, and FIG. 10, the case 20 of the secondary battery 100 may stretch outward to generate a swelling phenomenon. When the first case 21 stretches outward, the base film 32 attached to the first case 21 may also stretch outward to be transformed.

The first bridge 321 and the second bridge 322 of the base film 32 may be weak in their structures so when the base film 32 is transformed, at least one of a plurality of first bridges 321 and at least one of a plurality of second bridges 322 may be damaged and disconnected. Therefore, part of the conductive line 33 passing over the first bridge 321 and the second bridge 322 may be damaged and disconnected.

In an implementation, when at least one of the first bridges 321 are damaged, part of the conductive line 33 passing over the damaged first bridge 321 may also be damaged, and when at least one of the second bridges 322 is damaged, part of the conductive line 33 passing over the damaged second bridge 322 may be damaged.

The first terminal 35 and the second terminal 36 of the swelling sensor 30 may be electrically connected to the external circuit 40, and the external circuit 40 may supply a predetermined current to the conductive line 33. When part of the conductive line 33 is damaged by the damage of the first bridge 321 or the second bridge 322, a current flow may be blocked, and the external circuit 40 may determine that a swelling is generated when the current flow is not sensed.

The external circuit 40 may be electrically connected to a control unit of the external device using the secondary battery 100 as a power source, and it may output an alarm signal for notifying generation of swelling to the control unit of the external device when no current flow is sensed. The control unit of the external device may provide information for recommending replacement of secondary batteries to a user.

Figure 11:
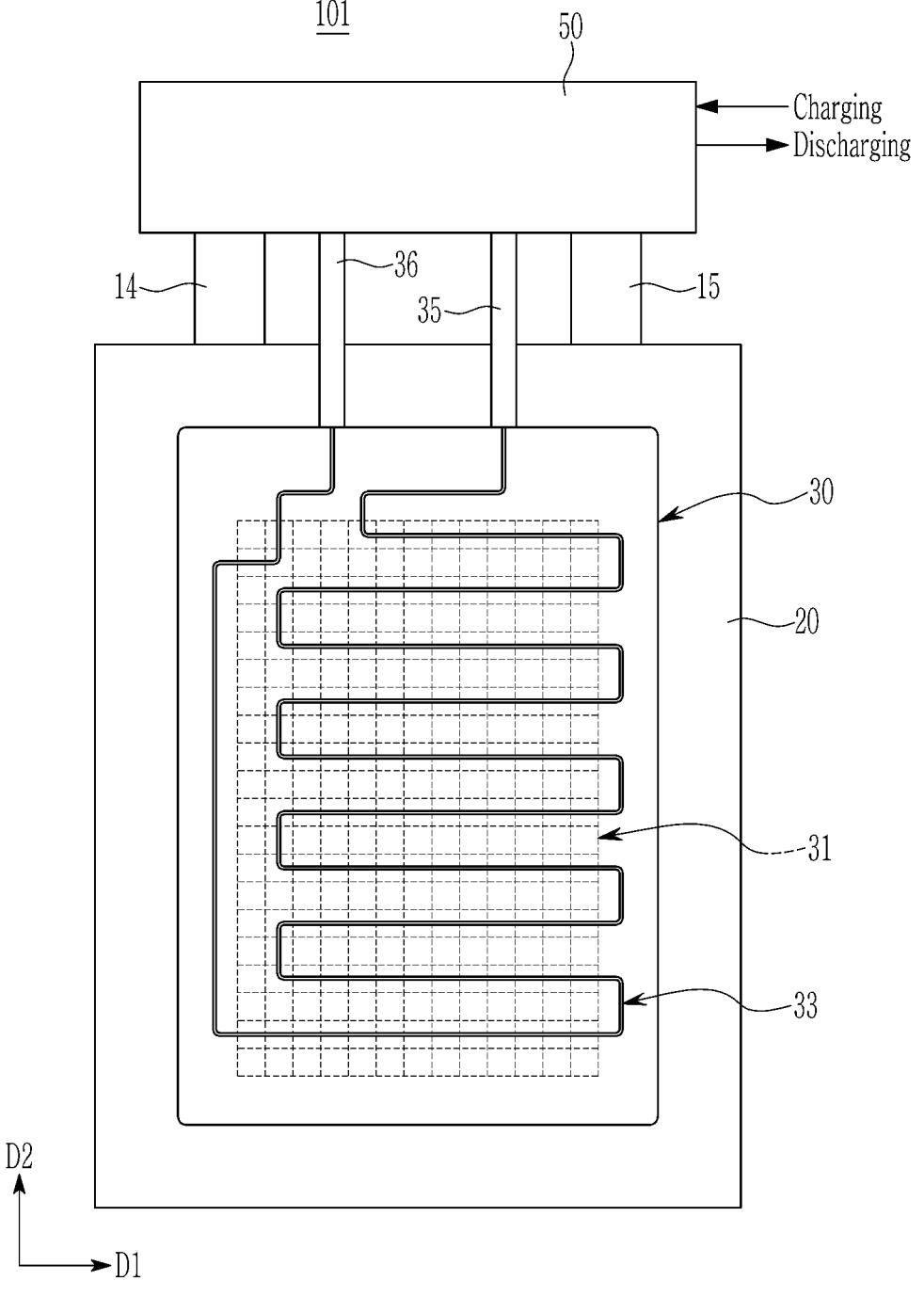
FIG. 11 shows a top plan view of a secondary battery according to an example embodiment.

FIG. 11 shows a top plan view of a secondary battery according to an example embodiment. Referring to FIG. 11, the first terminal 35 and the second terminal 36 of the swelling sensor 30 may be connected to a battery management system (BMS) 50 of the secondary battery 100, and the conductive line 33 may function as a charging and discharging path when the secondary battery 100 is charged and discharged.

In an implementation, the secondary battery 101 and the external device may not be directly connected to each other, but may be electrically connected to each other through the conductive line 33 of the swelling sensor 30 therebetween. Therefore, when the secondary battery 101 is discharged, a discharging current may be provided to the external device by moving through the conductive line 33, and when the secondary battery 101 is charged, a charging current may be provided to the secondary battery 101 by moving through the conductive line 33.

When the base film 32 is transformed by the swelling of the case 20 and part of the conductive line 33 is damaged, the secondary battery 101 may fail to be charged and discharged because of the incision of the conductive line 33. In an implementation, the secondary battery 101 may not be further used, and the case 20 of the secondary battery 101 may not further stretch outward and the swelling phenomenon may stop.

The above-configured secondary batteries 100 and 101 may sense the swelling of the case 20 in an earlier stage by using the swelling sensor 30. As a result, the secondary batteries 100 and 101 may prevent the external device from being damage by the swelling, and may efficiently reduce the risks of fire by preventing the ignition phenomenon caused by the swelling.

By way of summation and review, when the swelling phenomenon of the secondary battery 100 is neglected, the electronic device including the secondary battery 100 may be damaged, and self-ignition may be generated because of the damage to the case 20. Therefore, methods for sensing the swelling of the case 20, preventing the case 20 from swelling, and thereby reducing damages and ignition of the electronic device are developed. The present disclosure has been made in an effort to provide a secondary battery 100 including a swelling sensor 30 for sensing a swelling phenomenon of a case 20 in an earlier stage.

The secondary battery 100 according to an embodiment may sense the swelling of the case 20 in an earlier stage by using the swelling sensor 30. As a result, the secondary battery 100 may prevent the external device from being damaged by the swelling, may prevent the ignition phenomenon caused by the swelling, and may efficiently reduce the risk of fire.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery comprising:
an electrode assembly including a positive electrode, a negative electrode, and a separator;
a case accommodating and sealing the electrode assembly; and
a swelling sensor on an outer side of the case,
wherein the swelling sensor includes
a base film for providing a plurality of incised portions, and including a plurality of bridges among the incised portions, and
a conductive line on the bridges.

2. The secondary battery as claimed in claim 1, wherein the swelling sensor further includes an adhesive layer on a first side of the base film facing the outer side of the case, and
the conductive line is on a second side of the base film that is opposite the adhesive layer.

3. The secondary battery as claimed in claim 1, wherein each of the plurality of incised portions have a first plurality of incised portions in series in a first direction, and a second plurality of incised portions in series in a second direction traversing the first direction.

4. The secondary battery as claimed in claim 3, wherein the conductive line passes among the first plurality of incised portions and among the second plurality of incised portions and are in a zigzag pattern.

5. The secondary battery as claimed in claim 4, wherein the swelling sensor further includes:
a first terminal and a second terminal connected to respective end portions of the conductive line, and
an external circuit electrically connected to the first terminal and the second terminal and supplying a current to the conductive line.

6. The secondary battery as claimed in claim 4, wherein the swelling sensor further includes a first terminal and a second terminal connected to respective end portions of the conductive line,
the first terminal and the second terminal are connected to a battery management system, and
a charging current and a discharge current move along the conductive line.

7. A secondary battery comprising:
an electrode assembly including a positive electrode, a negative electrode, and a separator;
a case accommodating and sealing the electrode assembly; and
a swelling sensor attached to an outer side of the case,
wherein the swelling sensor includes:
a base film for providing a plurality of incised portions, and including a plurality of bridges among the incised portions, and
a conductive line on the bridges, and when the case swells, the base film is transformed, at least one of the plurality of bridges is damaged, and the conductive line is incised.

8. The secondary battery as claimed in claim 7, wherein the plurality of incised portions have a first plurality of incised portions in a first direction and a second plurality of incised portions in a second direction traversing the first direction, and
the plurality of bridges have a first plurality of bridges among the first plurality of incised portions and a second plurality of bridges among the second plurality of incised portions.

9. The secondary battery as claimed in claim 8, wherein the first plurality of incised portions have a long side in parallel to the first direction and a short side in parallel to the second direction, and
the second plurality of incised portions have a long side in parallel to the second direction and a short side in parallel to the first direction.

10. The secondary battery as claimed in claim 9, wherein widths of the first plurality of bridges are less than a length of the long side of the first incised portion, and
widths of the second plurality of bridges are less than a length of the long side of the second incised portion.

11. The secondary battery as claimed in claim 10, wherein widths of the first plurality of bridges are less than a length of the short side of the first incised portion, and
widths of the second plurality of bridges are less than a length of the short side of the second incised portion.

12. The secondary battery as claimed in claim 11, wherein the conductive line passes above the first plurality of bridges and the second plurality of bridges, and
a width of the conductive line is less than the widths of the first plurality of bridges and the widths of the second plurality of bridges.

13. The secondary battery as claimed in claim 8, wherein the conductive line includes:
a pattern portion passing above the first plurality of bridges and the second plurality of bridges and having a zigzag pattern, and
a return portion connected to an end portion of the pattern portion and along a first edge of the base film.

14. The secondary battery as claimed in claim 13, wherein the swelling sensor further includes a first terminal and a second terminal with a gap therebetween on a second edge of the base film, and
the first terminal is connected to the pattern portion, and the second terminal is connected to the return portion.

15. The secondary battery as claimed in claim 14, wherein the first terminal and the second terminal are connected to an external circuit, and
the external circuit supplies a current to the conductive line, and determines generation of swelling when a current flow is not sensed by a disconnection of the conductive line.

16. The secondary battery as claimed in claim 14, wherein the first terminal and the second terminal are connected to a battery management system,
a charging current and a discharging current move along the conductive line, and
a charging and discharging function is lost when the conductive line is incised.

17. The secondary battery as claimed in claim 1, wherein the case includes a first case on a first side of the electrode assembly and a second case on a second side of the electrode assembly and bonded to the first case along an edge, and
the swelling sensor is on at least one of the outer side of the first case and the outer side of the second case.

18. The secondary battery as claimed in claim 1, wherein the separator includes a complex film of a polyethylene and a polypropylene.

19. The secondary battery as claimed in claim 7, wherein the separator includes a complex film of a polyethylene and a polypropylene.

20. The secondary battery as claimed in claim 1, wherein the positive electrode includes a positive electrode current collector, and a positive electrode active material layer positioned on the positive electrode current collector.

* * * * *